United States Patent [19]

Willingham

[11] Patent Number: 4,787,589

[45] Date of Patent: Nov. 29, 1988

[54] MOUNTING AND MULTI-POSITIONAL CONNECTING BRACKET AND METHOD FOR MULTI-POSITIONAL CONNECTION TO AN ATTACHMENT MEANS

[76] Inventor: Richard A. Willingham, P.O. Box 5594, Vancouver, Wash. 98668

[21] Appl. No.: 106,520

[22] Filed: Oct. 8, 1987

[51] Int. Cl.[4] ............................................. E04G 3/00
[52] U.S. Cl. ................................... 248/278; 29/525.1
[58] Field of Search ............... 248/278, 279, 276, 274, 248/282, 284, 214, 219.4, 230, 231.8, 231.2, 296, 298; 29/526 R

[56] References Cited

U.S. PATENT DOCUMENTS

| | | |
|---|---|---|
| 669,114 | 3/1901 | Hartl . |
| 1,674,538 | 6/1928 | Williams . |
| 1,745,695 | 2/1930 | Hunter . |
| 2,082,631 | 6/1937 | Johnson ............................ 248/278 |
| 2,220,429 | 11/1940 | Soderberg ..................... 248/279 UX |
| 2,424,222 | 7/1947 | Brown et al. ........................ 248/278 |
| 2,454,613 | 11/1948 | Peltier et al. ..................... 248/278 X |
| 2,520,412 | 8/1950 | Jensen .............................. 248/278 X |
| 2,526,070 | 10/1950 | Early . |
| 2,651,725 | 9/1953 | McFarland . |
| 3,221,743 | 12/1965 | Thompson et al. . |
| 4,402,481 | 9/1983 | Sasaki ................................... 248/276 |
| 4,570,894 | 2/1986 | Miele .............................. 248/284 X |
| 4,711,422 | 12/1987 | Ibanez ............................. 248/279 X |

FOREIGN PATENT DOCUMENTS 0314238 6/1929 United Kingdom ................ 248/291

Primary Examiner—Ramon O. Ramirez
Attorney, Agent, or Firm—Marger & Johnson

[57] ABSTRACT

This invention relates to a mounting and multi-positional connecting bracket. The bracket comprises a bracket means which is unitary, i.e., formed of a one-piece construction. The bracket means includes a mounting portion and a connector portion, respectively. The mounting portion is provided without externally-yieldable openings for directly securedly fastening the bracket means in a fixed positon to a first attachment means. The connector portion includes means defining a fully enclosed internally-yieldable passageway, without any externally-yieldable openings. The passageway is adapted for adjustably securedly engaging a second attachment means therewithin without unfastening the bracket means from the first attachment means.

21 Claims, 1 Drawing Sheet

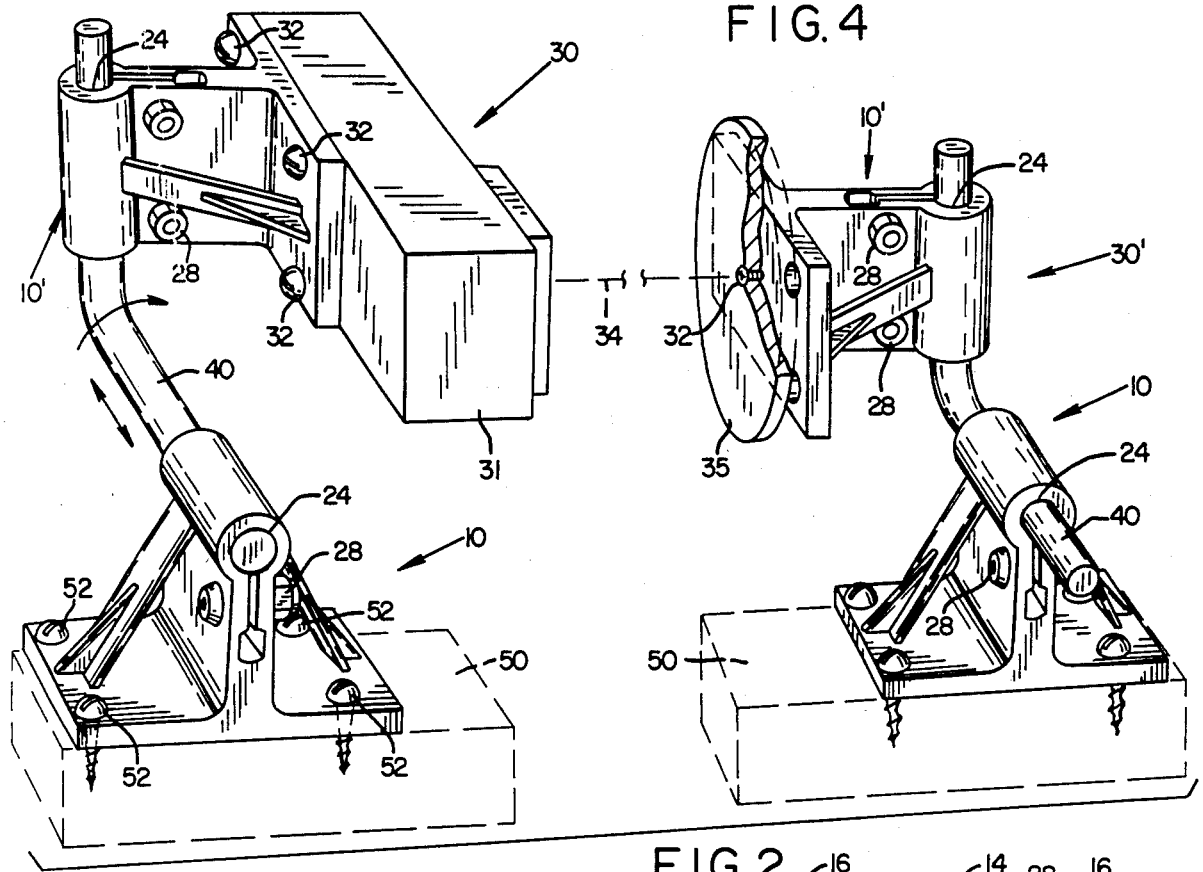
FIG. 4
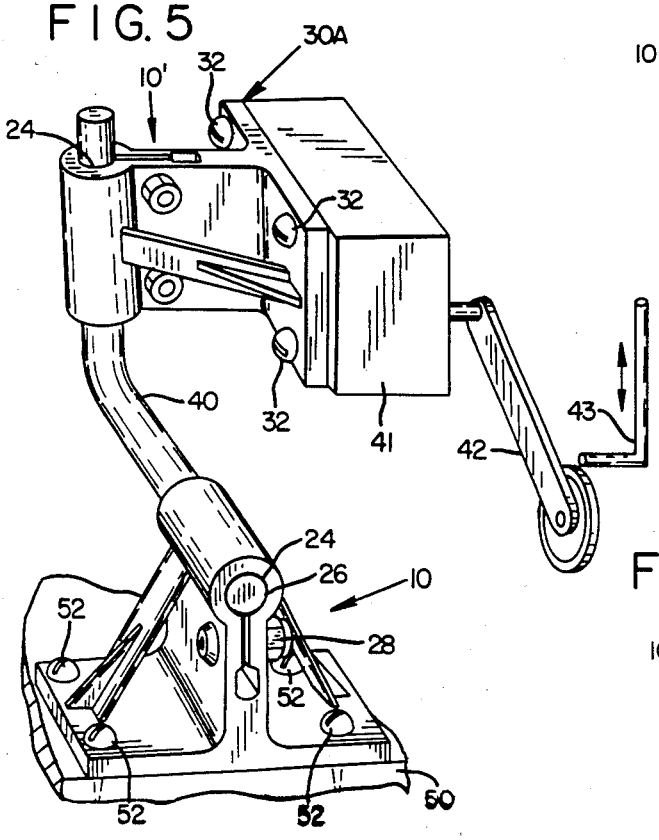
FIG. 5
FIG. 2
FIG. 1
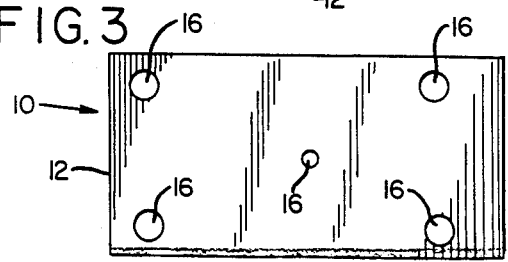
FIG. 3

MOUNTING AND MULTI-POSITIONAL CONNECTING BRACKET AND METHOD FOR MULTI-POSITIONAL CONNECTION TO AN ATTACHMENT MEANS

BACKGROUND OF THE INVENTION

This invention relates to brackets comprising both support means for fastening said bracket in a securely fixed position, and connecting means for the multi-positional engagement of attachment means therewithin, as well as to respective bracket assemblies and bracket systems employing such brackets.

Externally-yieldable support clamps made of metal are well known in the prior art. For example, U.S. Pat. No. 669,114 relates to a support assembly for telephone receivers. The telephone receiver support is attached to receiver D by a metal clamp in the form of a stirrup C which is externally-yieldable, i.e., open at one end, and moved into tightening engagement about receiver D by using bolt C. Since the clamp is externally-yieldable and open at one end of clamp C, bar B must be indirectly attached to the side of clamp C within socket C2. Thus, telephone receiver is not directly and securely supported for minimum relative movement.

Similar externally-yieldable metallic clamping devices in which the clamping means is enclosed at the upper end and has an open slot at the support end are described in U.S. Pat. Nos. 2,651,725 and 3,221,743. The entire fixed support for this device is indirect attachment at the side of the clamping structure itself. Indirect attachment limits the amount of support a given clamping device can provide for an attachment means. Furthermore, metallic clamping devices, particularly, such as those set out in U.S. Pat. No. 3,221,743, are quite expensive to manufacture.

Other externally-yieldable clamping devices are formed of multi-sectional components which are open at both ends of the structure. Thus, in U.S. Pat. Nos. 1,674,538, 1,745,695 and 2,526,070, respectively, clamping devices having separate, substantially symmetrical clamping sections, which must be held together by bolts and the like, are employed to grasp onto bars, tubular bodies, or support arms, respectively. There devices are only as dimensionally stable as the means for holding them together. Therefore, on loosening of the bolts for connection purposes, the entire clamping device becomes dimensionally unstable. In U.S. Pat. No. 1,745,695 a pin 30 is even further provided to maintain arm A in fixed position against rotational movement.

Therefore, a need exists for a bracket system of unitary construction, which includes a fully enclosed dimensionally stable design for connecting an attachment means thereto, and which further includes a mounting portion adapted for direct, maximum support when fastened to an attachment means, such as to a fixed attachment surface.

SUMMARY OF THE INVENTION

This invention relates to a mounting and multi-positional connecting bracket. The bracket comprises a bracket means which is unitary, i.e., formed of a one-piece construction. The bracket means includes a mounting portion and a connector portion, respectively. The mounting portion is provided without externally-yieldable openings for directly securely fastening the bracket means in a fixed position to a first attachment means. The connector portion includes means defining a fully enclosed internally-yieldable passageway, without any externally-yieldable openings. The passageway is adapted for adjustably securedly engaging a second attachment means therewithin without unfastening the bracket means from the first attachment means. Preferably, the passageway comprises means defining a fully-enclosed, internally-yieldable aperture and slot, respectively. The bracket can further include means disposed within the connector portion adapted for narrowing the slot and for yieldably reducing the size of the aperture. In this way, the second attachment means is securely engaged within the passageway without substantially effecting the configuration of the mounting portion.

The bracket preferably includes a second attachment means comprising a bracket support arm which is securedly engaged at one end within the passageway for adjustable forward, backward, and rotational movement in any one of an axial and transverse direction, to a plurality of fixed positions. Furthermore, the mounting portion preferably comprises a support base, without externally-yieldable openings, having the connector portion joined thereto.

A bracket assembly can be formed by connecting together the first mounting and multi-positional bracket and a second such bracket employing a bracket support arm as the connecting means. The second mounting and multi-positional connecting bracket comprises a second unitary bracket means having the same structural configuration and functional capabilities as the first unitary bracket means described above. In the bracket assembly of the present invention, the passageway within each of the brackets typically comprises means defining an aperture and a slot, respectively. Preferably, in each of the subject bracket assemblies, each of the passageways comprises a substantially key-shaped cross-section configuration in which each aperture is substantially cylindrically-shaped, and the bracket support arm has a cylindrical configuration for fitting engagement within the aperture. The bracket assembly can include, as one of the first attachment means, for example, either a photoelectric cell for transmitting an electrical signal or a reflective target for receiving an electrical signal. The bracket support arm of the bracket assembly of this invention is axially or rotationally adjustable within the passageways of the first and second unitary bracket means to provide two degrees of free of movement for each unitary bracket means connected thereto.

A pair of the above-described mounting and multi-positional connecting bracket assemblies together can form a bracket system. Once the respective bracket assemblies are in an aligned position, the first attachment means in each of the bracket assemblies of the bracket system are adjustably moved to an aligned position one with respect to the other. The bracket support arms of the bracket assemblys which form the bracket system of this invention are axially or rotationally adjustable within each of the passageways to provide four degrees of freedom of movement for each of the unitary bracket means connected thereto. For instance, a first attachment means in each respective bracket assembly can comprise a photoelectric cell for transmitting an electrical signal and a reflective target for receiving an electrical signal, which are aligned one with the other so that when objects interrupt the signal, as in a counting operation, the number of interruptions can be determined.

The preferred unitary bracket means of this invention comprises a base section; means located in said base section for fastening said base section in a fixed position to a first attachment means; a connector section joined to said base section to form a unitary bracket structure; and means defining a fully enclosed, internally-yieldable passageway, without externally-yieldable openings, adapted for adjustably and securely engaging a second attachment means within said passageway, without unfastening said bracket means from said first attachment means. The second attachment means is a bracket support arm including respective first and second sections which are angularly disposed one with respect to the other, and preferably at a substantially right angle one with respect to the other. The unitary bracket preferably is fabricated of a polymeric material.

This invention also relates to a method for mounting and adjustably positioning respectively a bracket support arm, a second unitary bracket means to form a bracket assembly, and a second bracket assembly to form a bracket system. The unitary bracket means comprises a mounting portion and a connector portion, respectively, each without externally-yieldable openings. The mounting portion includes means for fastening the bracket means to a fixed attachment surface, and the connector portion includes means defining a fully enclosed, internally-yieldable passageway. The mounting portion is then fastened to a first attachment means and the bracket support arm is introduced into the internally-yieldable passageway, without substantially effecting the external configuration of the bracket, and without unfastening the bracket means from the first attachment means. The location of the attachment means within the passageway is then adjusted to any one of a plurality of respective axial and transverse positions, closing the passageway until it securely engages the second attachment means within the passageway and thereby retaining the second attachment means in a fixed position.

The method is also directed to a bracket assembly comprising respective first and second mounting and multi-positional connecting brackets and a bracket support arm. Thus, the mounting portion of a second unitary bracket means is fastened to an attachment means. The second unitary bracket means is then positioned on the bracket support arm, without substantially effecting the configuration of the mounting portion, and without unfastening the bracket means from the attachment means, the location of the bracket support arm adjusted within the bracket means to any one of a plurality of respective axial and transverse positions, and the passageway of the second bracket yieldably closed until it securely engages the second attachment means thereby retaining the second attachment means in a fixed position.

Another inventive method comprises providing first and second bracket assemblies in the form of a bracket system. Preferably, the first attachment means in each of the first and second bracket assembly respectively transmit and receive an electrical output signal. The first attachment means in each of the first and second bracket assemblies is moved in aligned position one with the other as previously described above. In the preferred case, an electrical output signal is transmitted from the first attachment means in the first bracket assembly and received by the first attachment means in the second bracket assembly for use in application such as electrical counters and the like.

The foregoing and other objects, features and advantages of the invention will become more readily apparent from the following detailed description of a preferred embodiment which proceeds with reference to the drawings.

DETAILED DESCRIPTION OF THE DRAWINGS

FIG. 1 is an enlarged front, elevational view of the mounting bracket of the present invention.

FIG. 2 is a top view of the mounting bracket of FIG. 1.

FIG. 3 is a bottom view of the mounting bracket of FIG. 1.

FIG. 4 is a perspective, partially fragmentary view of a mounting bracket system in the form of photoelectric detection system, including a pair of mounting bracket assemblies, each mounting bracket assembly including a pair of the mounting brackets depicted in FIG. 1.

FIG. 5 is a perspective partially-fragmentary view of a mounting bracket assembly in the form of limit switch, including a pair of the mounting brackets depicted in FIG. 1.

DETAILED DESCRIPTION OF A PREFERRED EMBODIMENT

Referring now to FIGS. 1-3, a mounting and multi-positional connecting bracket 10 comprises a unitary, fully enclosed bracket means which is constructed without any externally-yieldable openings, and which includes a mounting portion 12 for securely fastening the bracket means in a fixed position to attachment means 50, and a connector portion 14 adapted for adjustably and securedly engaging bracket support arm 40, respectively. Mounting portion 12 comprises a support base, without any externally-yieldable openings, in the form of a rectangular plate member, for fastening the bracket 10 to attachment means 50. Mounting portion 12 includes means defining a plurality of holes 16. The mounting portion 12 can be fabricated in a plurality of thicknesses and/or configurations to facilitate secure fastening of the mounting bracket 10 in a fixed position. In any case, the mounting portion 12 provides rigid structure integrity for the bracket 10.

Referring to FIG. 4, mounting brackets 10' are joined in a fixed position, respectively, by means of bolts, screws or the like 32, to a photoelectric cell 30 or a reflective target 30' for transmitting an electrical signal 34 to reflective target 35. In order to provide rigid support for maintaining connector portion 14 in a fixed position, auxiliary support means 18 in the form of strut means are included which are attached at one end 20 to connector means 14 and at the other end 22 to fastener portion 12. For purposes of further reinforcement of the auxiliary support means 18, stiffening elements 23 are joined thereto.

Connector portion 14 is joined onto base section 12 and maintained in position by auxiliary support means 18. Connector section 14 includes means defining a fully enclosed internally-yieldable, passageway 24 for adjustably and securedly engaging attachment means 40 which is, for example, a bracket support arm, such as depicted in FIGS. 4 and 5. Passageway 24 comprises means defining an aperture 26 and a slot 27, respectively. A nut and bolt assembly 28 passes through apertures 29 in connector portion 14 and slot 27, respectively, for yieldably narrowing the slot 27 using assembly 28, and yieldably expanding the slot 27 on loosening assembly 28. The assembly 28 is not employed for holding the bracket structure in place. In this way, the size of aperture 26 can be increased or decreased by narrowing and loosening slot 27, thereby securely engaging and disengaging bracket support arm 40 within passageway 24. Passageway 24 preferably comprises a substantially key-shaped cross-sectional configuration in which aperture 26 is substantially cylindrically-shaped.

It should be noted that when slot 27 and aperture 26 are respectively narrowed during the step of securely engaging support arm 40, since bracket 10 is internally-yieldable, the external periphery 25 of connector portion 24, as well as the fastening portion 12, do not exhibit any substantial dimensional change. Therefore, the mounting bracket will remain in a fixed position with respect to the surface to which the base section is joined during the adjustment operation. This is due to the closed, unitary configuration of the bracket 10 of the present invention.

Referring again to FIG. 4, bracket assembly 30 and bracket assembly 30' each comprise a pair of mounting brackets 10, as previously described, connected one to the other by bracket support arm 40. More specifically, support arm 40 is adjustably and securely engaged to each of the mounting brackets within passageway 24 and is adapted for adjustable forward, backward, and rotational movement in any one of an axial and transverse direction within passageway 24 to a plurality of fixed positions. Mounting bracket 10 is attached to attachment surfaces 50 via screws 52. Attachment surfaces 50 can be any surface capable of having the bracket means mounted thereto including manufacturing equipment in a manufacturing facility. One mounting bracket 10 supports, via support arm 40, mounting bracket 10' having a photoelectric cell 31 attached thereto via screws 32. The photoelectric cell can be a Cutler-Hammer E-51 series manufactured by Eaton Corporation of Milwaukie, Wis. The second mounting bracket assembly 30' is mounted on a fixed surface 50' so that bracket 10 is joined thereto in a fixed position by screws 52. In this case, reflective target 35 is attached to mounting bracket 10' connected via bracket support arm 40 to mounting bracket 10. A Cutler-Hammer target reflector model E-51KR84 (3" diameter) can be employed herein. Attachment in this case is made via screw 32 into opening 16 in plate 12.

In use, mounting brackets 10 are joined to fixed surfaces 50 by screws 52. Apertures 26 are moved to an open position, if not already in an open position, by loosening bolt and nut assembly 28. Bracket support arms are then introduced into aperture 26 and passageway 24. Next, photoelectric cell 31 and reflective target 35 are connected to respective mounting brackets 10' by screws 32. Once in place, the mounting brackets 10' are slid onto the free end of bracket support arm 40 so that the support arm engages passageway 24 of mounting bracket 10'. The position of photoelectric cell 31 and reflective target 35 on support arm 40 is vertically adjusted and the position of support arms 40 within passageways 24 of mounting brackets 10 are horizontally and rotationally adjusted, so that the photoelectric cell 31 and the target plate 35 are aligned one with the other. In this way, an electrical output signal 34 emanating from photoelectric cell 31 will be received by reflective target 32. Bolt and nut assemblies 28 are then tightened on mounting brackets 10 and 10', respectively, so that the line position of photoelectric cell 31 and reflective target 35 are permanently maintained during operation thereof.

With respect to FIG. 5, a limit switch system is depicted as follows:

Bracket assembly 30A comprises a pair of mounting brackets 10, as previously described, connected one to the other by bracket support arm 40. More specifically, support arm 40 is adjustably and securely engaged to each of the mounting brackets within passageway 24 and is adapted for adjustable forward, backward, and rotational movement in any one of an axial and transverse direction within passageway 24 to a plurality of fixed positions.

Mounting bracket 10 is attached to attachment surfaces 50 via screws 52. Attachment surfaces 50 can be any surface capable of having the bracket means mounted thereto including manufacturing equipment in a manufacturing facility. One mounting bracket 10 supports, via support arm 40, mounting bracket 10' having a limit switch 41 attached thereto via screws 32. The limit switch can be a Cutler-Hammer E-50 series manufactured by Eaton Corporation of Milwaukie, Wis.

The limit switch arm 42 can be a Cutler-Hammer E-50 KL200 series, also manufactured by Eaton Corporation. The switch actuator 43 can be any moving component on a piece of equipment, where a limit on component positioning is required. For example, one can set the predetermined amplitude of the stroke of a hydraulic cylinder or the extent of movement of a drill bit assembly employing a limit switch.

In use, a mounting bracket 10 is joined to fixed surface 50 by screws 52. Apertures 26 are moved to an open position, if not already in an open position, by loosening bolt and nut assembly 28. Bracket support arms are then introduced into apertures 26 of passageway 24. Next, limit switch 41 is connected to respective mounting brackets 10' by screws 32. Once in place, the mounting brackets 10' are slid onto the free end of the bracket support arm 40 so that the support arm engages passageway 24 of mounting bracket 10'. The position of limit switch 41 on the support arm 40 is vertically adjusted and the position of support arm 40 within apertures 26 of mounting brackets 10 are horizontally and rotationally adjusted, so that the limit switch arm 42 and the limit switch actuator 43 are aligned one with the other. In this way, when the limit switch actuator 43 comes in contact with the limit switch arm 42, the result will be a contact closure within limit switch 41, providing an electrical output signal, indicating a known position has been achieved.

Mounting brackets 10 are fabricated of a non-metallic material to reduce cost and for ease of unitary manufacture. Preferably, polymeric materials are employed herein such as a polycarbonate material, designated MERLON POLYCARBONATE M50H, manufactured by Mobay Corporation division of A. Bayer U.S.A. Inc. Company, of Pittsburgh, Pa.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

I claim:

1. A mounting and multi-positional connecting bracket, which comprises a unitary bracket means including a mounting portion, without externally-yieldable openings, for directly securely fastening said bracket means in a fixed position to a first attachment means, and a connector portion including means defining a fully enclosed internally-yieldable passageway, without externally-yieldable openings, adapted for adjustably securely engaging a second attachment means within said passageway without unfastening said bracket means from said first attachment means, said passageway means defining a fully-enclosed, internally-yieldable aperture and slot, respectively.

2. The unitary bracket means of claim 1, which is fabricated of a polymeric material.

3. The bracket of claim 1, which further includes means disposed within said connector portion adapted for narrowing said slot and for yieldably reducing the size of said aperture, and thereby securely engaging said second attachment means within said passageway without substantially effecting the configuration of said mounting portion.

4. The bracket of claim 1, which further includes a second attachment means comprising a bracket support arm securely engaged at one end within said passageway for adjustable forward, backward, and rotational movement in any one of an axial and transverse direction, to a plurality of fixed positions.

5. The bracket of claim 1, wherein said mounting portion comprises a support base, without externally-yieldable openings, having said connector portion joined thereto.

6. The bracket of claim 4, which further includes a second mounting and multi-positional connecting bracket comprising a second unitary bracket means, including a mounting portion, without externally-yieldable openings, for directly securely fastening said second bracket means in a fixed position to a third attachment means, and a connector portion including means defining a fully enclosed internally-yieldable passageway, without externally-yieldable openings, the other end of said bracket support arm being securely engaged within said passageway of said second bracket for adjustable forward, backward, and rotational movement, in any one of an axial and transverse direction, to a plurality of fixed positions, said respective first and second mounting and multi-positional connecting brackets and said bracket support arm together forming a bracket assembly.

7. The bracket assembly of claim 6, wherein each said passageway of each said bracket comprises means defining an aperture and a slot, respectively.

8. The bracket assembly of claim 7, wherein each said passageway comprises a substantially key-shaped cross-section configuration in which each said aperture is substantially cylindrically-shaped, and said bracket support arm has a cylindrical configuration for fitting engagement within said aperture.

9. The bracket assembly of claim 7, wherein each said bracket includes means disposed within said connector portion adapted for narrowing said slot and for yieldably reducing the size of each said aperture, thereby securely engaging said second attachment means within said passageways, without substantially effecting the configuration of each said mounting portion.

10. The bracket assembly of claim 6, wherein one of said first attachment means comprises a photoelectric cell for transmitting an electrical signal.

11. The bracket assembly of claim 6, wherein one of said first attachment means comprises a reflective target for receiving an electrical signal.

12. The bracket assembly of claim 6, wherein the mounting portion of each said bracket comprises a support base, without externally-yieldable openings, having said connector portion joined thereto.

13. The bracket assembly of claim 6, which further includes a second mounting and multi-positional connecting bracket assembly comprising a pair of said mounting and multi-positional connecting brackets and a second attachment means for securely engaging each of said brackets within each said passageway for adjustable forward, backward, and rotational movement, in any one of an axial and transverse direction, to a plurality of fixed position, said respective mounting and multi-positional connecting bracket assemblies together forming a bracket system,
 a first attachment means in each of said bracket assemblies of said bracket system being adjustably movable to an aligned position one with respect to the other.

14. The bracket system of claim 13, wherein said respective aligned first attachment means comprises a photoelectric cell for transmitting an electrical signal and a reflective target for receiving an electrical signal.

15. The bracket system of claim 14, wherein said second attachment means comprises a bracket support arm including respective first and second sections which are angularly disposed one with respect to the other.

16. The bracket system of claim 14, wherein said respective first and second sections are angularly disposed at a substantially right angle one with respect to the other.

17. A method for mounting and adjustably positioning a bracket support arm, which comprises:
 providing a unitary bracket means comprising a mounting portion and a connector portion, respectively, each without externally-yieldable openings, said mounting portion including means for fastening said bracket means to a fixed attachment surface, and said connector portion including means defining a fully enclosed, internally-yieldable passageway comprising means defining a fully-enclosed, internally-yieldable aperture and slot, respectively;
 fastening said mounting portion to a first attachment means;
 introducing said bracket support arm into said fully-enclosed, internally-yieldable aperture, without substantially effecting the external configuration of said bracket, and without unfastening said bracket means from said 1st attachment means;
 adjusting the location of said attachment means within said aperture to any one of a plurality of respective axial and rotational positions; and
 closing said passageway until it securely engages said second attachment means within said passageway thereby retaining said second attachment means in a fixed position.

18. The method of claim 17, which further includes the steps of:
 providing a second unitary bracket means comprising a mounting portion and a connector portion, respectively, said connector portion including means defining a fully enclosed internally-yieldable passageway, without any externally-yieldable openings;
 fastening said mounting portion of said second unitary bracket means to an attachment means;

positioning said second unitary bracket means on said bracket support arm, without substantially effecting the configuration of said mounting portion, and without unfastening said bracket means from said attachment means;

adjusting the location of said bracket support arm within said bracket means to any one of a plurality of respective axial and transverse positions;

yieldably closing said passageway of said second bracket until it securely engages said second attachment means thereby retaining said second attachment means in a fixed position; and said respective first and second mounting and mult-positional connecting brackets and said bracket support arm together forming a bracket assembly.

19. The method of claim 18, which further includes the step of:

providing a second said bracket assembly, and first attachment means in said first and second bracket assembly which respectively transmit and receive and electrical output signal;

positioning said first attachment means in each of said first and second bracket assemblies in aligned position one with the other;

transmitting an electrical output signal from the first attachment means in said first bracket assembly; and receiving said electrical output signal from the first attachment means in said second bracket assembly.

20. A multi-positional mounting and connecting unitary bracket means, which comprises a base section;

means located in said base section for fastening said base section in a fixed position to a first attachment means;

a connector section joined to said base section to form a unitary bracket structure; and means defining a fully enclosed, internally-yieldable passageway, without externally-yieldable openings, adapted for adjustably and securely engaging a second attachment means within said passageway, without unfastening said bracket means from said first attachment means, said passageway comprising means defining a fully-enclosed internally-yieldable aperture and slot, respectively.

21. The unitary bracket means of claim 20, which is fabricated of a polymeric material.

* * * * *